United States Patent

[11] 3,550,804

| [72] | Inventor | Harold A. De Remer<br>Allentown, Pa. |
|---|---|---|
| [21] | Appl. No. | 811,485 |
| [22] | Filed | Mar. 28, 1969 |
| [45] | Patented | Dec. 29, 1970 |
| [73] | Assignee | General Electric Company<br>a corporation of New York |

[54] ELECTRIC TOASTER CASING CONSTRUCTION
3 Claims, 7 Drawing Figs.

[52] U.S. Cl............................................. 220/4,
220/80
[51] Int. Cl........................................ B65d 7/12,
A47j 37/08
[50] Field of Search............................ 220/4, 80;
99/385, 401

[56] References Cited
UNITED STATES PATENTS

| 2,101,551 | 12/1937 | Marsh .......................... | |
| 2,781,146 | 2/1957 | Eddy ............................ | 220/4 |
| 2,903,183 | 8/1959 | Velepec ....................... | 220/4X |
| 3,281,005 | 10/1956 | Schumacher................. | 220/4X |
| 3,334,576 | 8/1967 | Bufkin.......................... | 99/385 |
| 3,482,727 | 12/1969 | Hitzeroth ..................... | 220/4 |

Primary Examiner—George E. Lowrance
Attorneys—Lawrence R. Kempton, Leonard J. Platt and John F. Cullen and Frank L. Neuhauser, Oscar B. Waddell and Melvin M. Goldenberg ABSTRACT: An electric toaster construction wherein a unique H-shaped clip is provided for connecting two toaster casing shells to each other.

Inventor:
Harold A. De Remer
by *Leonard J. Platt*
Attorney

PATENTED DEC 29 1970

Inventor:
Harold A. DeRemer by *Leonard J. Platt*

Attorney

ELECTRIC TOASTER CASING CONSTRUCTION

BACKGROUND OF THE INVENTION

This invention relates to an electric toaster casing construction, and more particularly, to a unique clip arrangement for connecting electric toaster casing shells to each other.

Electric toasters have conventionally included sheet metal casing shells for enclosing the bread guards, heater wires, toaster carriages and the other components of the toaster. While the casing shells have been shaped and constructed, subassembled and assembled in a number of different ways, it is especially desirable that they be sturdily constructed and securely assembled to each other and to the other electric toaster components. It is also desirable to provide an electric toaster casing shell assembly which is capable of being easily disassembled if necessary.

In the manufacture of electric toasters, the cost of production becomes an extremely important factor. This factor depends mainly on the number of elements necessary for proper functioning, the space required by the elements, the ease with which the elements may be assembled to each other and the speed with which these elements may be assembled to each other. These factors need to be attacked without any sacrifice whatsoever as to the reliability and the integrity of the completed electric toaster. It is most important therefore to reduce to a minimum the number of parts required, the number of manufacturing operations to be performed on each part and the number of operations required to assemble the parts to each other.

SUMMARY OF THE INVENTION

Accordingly, it is a primary object of this invention to provide an improved, low cost construction arrangement for securely connecting electric toaster shells to each other.

In accordance with one of the aspects of this invention, two casing shells are provided with complementary mating edges and connecting slots are formed in each of the shells. The slot in one shell is arranged to be generally parallel to the edge of the shell and to the slot formed in the other shell. A uniquely formed H-shaped clip is inserted within the slots for securely connecting the shells to each other. The clip includes a center web portion and two pairs of legs extending outwardly from the web. The end portions of each of the legs are bent to be generally perpendicular to the main portions of the legs and four hook portions are integrally formed at the end portions of each of the legs. With this construction, when the unique clips are inserted within the slots to hold the casing shells to each other, the hook portions securely grip the inside surfaces of the casing shells adjacent to the slots and the portions of the legs adjacent to the web portions are positioned over the outside surface of the shells between the slots.

With this unique arrangement, the clips may be quickly inserted within the slots and straightened to cause the hook portions to tightly grip the inside surfaces of the shells. The assembly permits relatively large manufacturing tolerances since the legs of the H are free to bend with respect to the web portions of the H-shaped clip.

BRIEF DESCRIPTION OF THE DRAWINGS

Other objects and attendant advantages of the invention will be apparent from the following description taken in connection with the accompanying drawings in which.

DESCRIPTION OF THE PREFERRED EMBODIMENT

Figure 1:
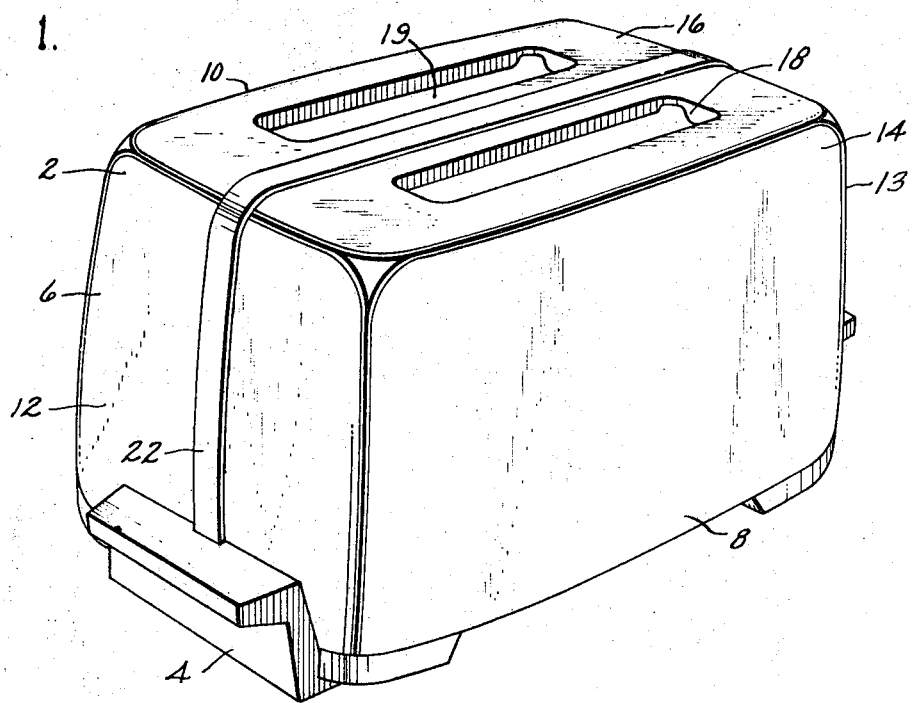
FIG. 1 is a perspective view of an electric toaster construction embodying the invention.

Referring now to the drawing and first particularly to FIG. 1, there is shown an electric toaster 2 which includes a base member 4 and a casing 6. As shown, the casing includes a front wall 8, a rear wall 10, sidewalls 12 and 13 and a top wall 16. Bread receiving slots 18 and 19 are formed in the top wall 16 of the casing. As illustrated in FIG. 1, a decorative band 22 which may be formed of metal or other suitable material extends upwardly from the lower portion of one of the sidewalls across the top wall 16 and then downwardly along the other sidewall.

Figure 2:
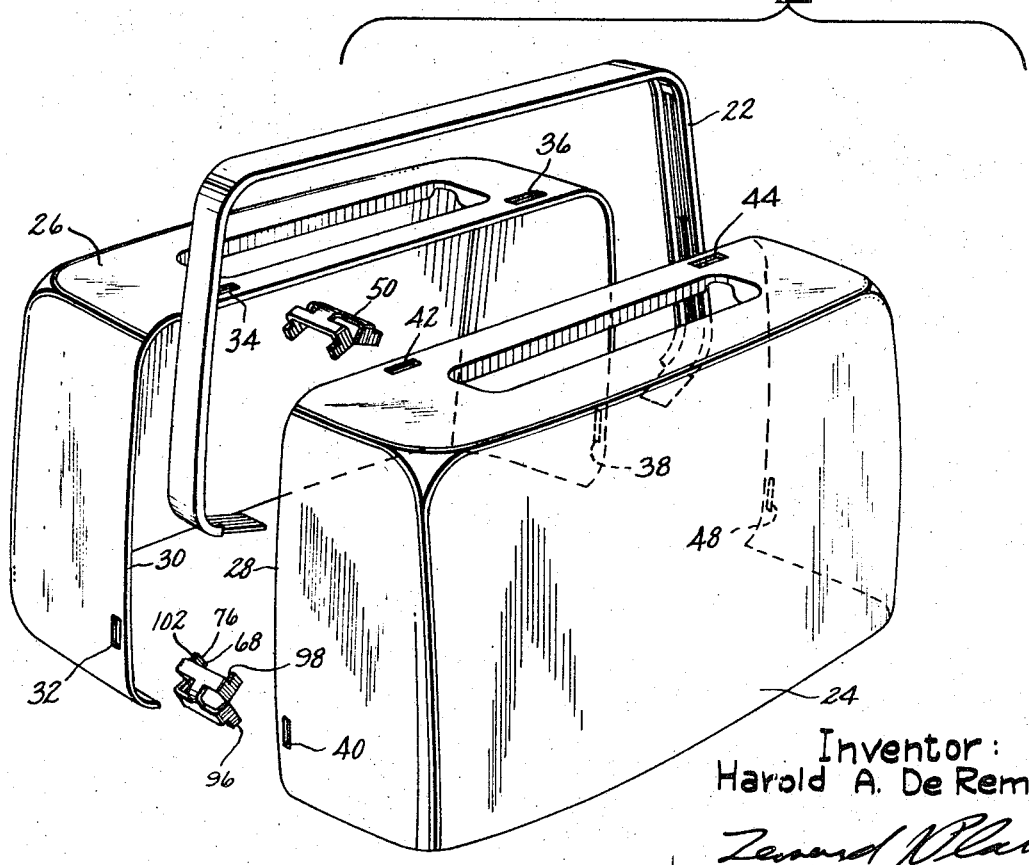
FIG. 2 is an exploded perspective view of the electric toaster casing shown in FIG. 1.
Figure 3:
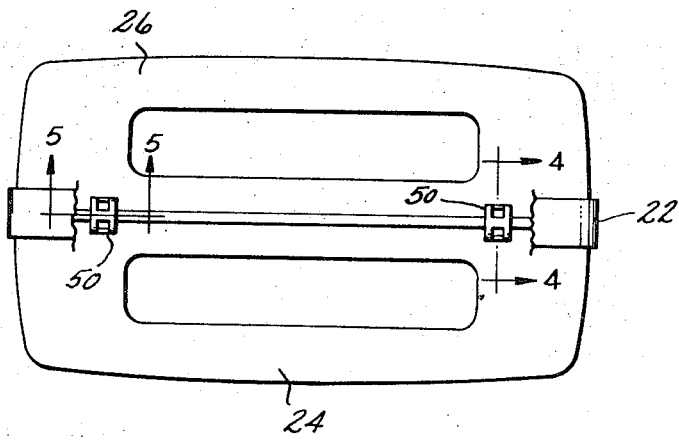
FIG. 3 is a top plan view of the electric toaster shown in FIG. 1 with portions of a decorative metal band broken away to show details of construction.

With particular reference to FIG. 2, it can be appreciated that the casing 6 is formed of two sheet metal half shells 24 and 26; and in accordance with my invention, a unique mechanism is provided for connecting the casing halves 24 and 26 to each other. As shown, the casing halves 24 and 26 each includes a mating edge 28 and 30, respectively, which extend upwardly along the sidewalls across the top walls and downwardly along the other half sidewall. Slots are formed adjacent to the mating edges 28 and 30 for receiving a unique clip 50 for connecting the casing halves to each other. As shown, slots 32, 34, 36 and 38 are formed in casing half 26 for cooperation with generally parallel complementary slots 40, 42, 44 and 48 which are formed in the other casing half.

Figure 7:
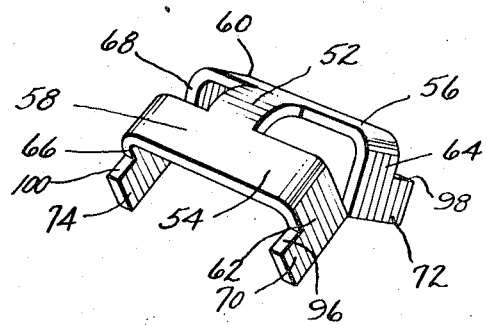
FIG. 7 is a perspective view showing the unique clip for attaching the shells to each other.

My uniquely formed and dimensioned clip 50 for securely connecting the casing halves to each other is more particularly shown in FIG. 7. The clip is generally H-shaped and includes a center web portion 52, two pairs of legs 54 and 56 extending outwardly from one side of the center web 52 and another pair of legs 58, 60 extending outwardly from the other side of the web 52. The end portions 62, 64, 66 and 68 of the legs 54, 56, 58 and 60, respectively, are bent to be generally perpendicular to the main portions of the legs. Four hook portions 70, 72, 74 and 76 are integrally formed at the ends of each of the legs for gripping the inner surface of the shell as shown more particularly in FIG. 5. As shown in FIG. 7, the hook portions 70, 72, 74 and 76 are arranged generally perpendicular to the end portions 62, 64, 66 and 68, respectively, of the legs.

In accordance with my invention, the center web portion 52 of my unique H-shaped clip is bent to permit the hook portions of the clip to inserted within the slots 32, 40, 34, 42, 36, 44 and 38, 48. As shown, the degree of bend is such that the plane of legs 54 and 58 is at an angle of approximately 30° with respect to the plane of legs 56 and 60.

Figure 6:
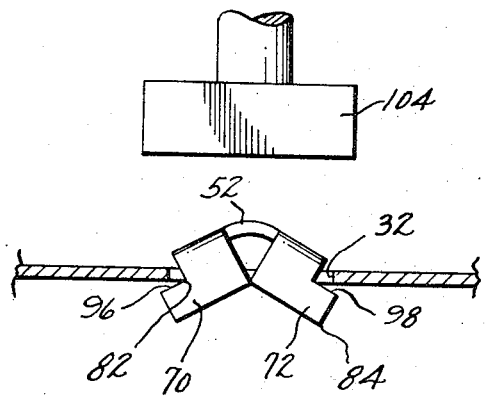
FIG. 6 is a partial cross-sectional view of the electric toaster clip showing the clip inserted within one of the slots but before it has been flattened to securely hold the toaster shells to each other.

With particular reference to FIG. 6, it can also be appreciated that the size of the slots is related to the size of the unique clip and to the preformed bend at the center web portion 52 so that the clip may be inserted within the slot. Thus, as shown in FIG. 6, the distance from the bottom of notch 82 to a point 84 at the end of hook 72 is less than the length of the slot.

Figure 5:
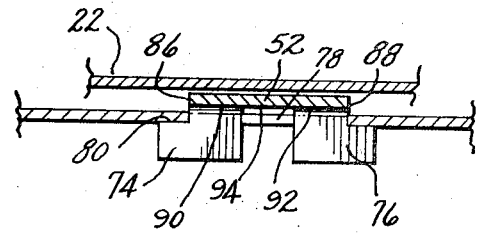
FIG. 5 is a partial cross-sectional view of the electric toaster shown in FIG. 3 taken substantially on the plane 5—5 of FIG. 3.

It can also be appreciated that the size of the slots 40, 32, 42, 34, 44, 36, 48 and 38 is related to the size of the clips and particularly the hook portions 70, 72, 74 and 76 so that when a clip has been inserted within a slot and flattened, as shown in FIG. 5, the slot is small enough and the distance from the side edge 86 of one of the legs to the side edge 88 of the other one of said pair of legs is great enough so that the side edges 86 and 88 abut the edges of the slot. It can also be seen that the distance from the under side portions 90 and 92 of the legs and the under side portion 94 of the center web to the inner edges 96, 98, 100, 102 of the hooks which grip the inside surface of the shell is approximately equal to the thickness of the shell material.

With this construction, the casing shells 24 and 26 may be quickly and readily assembled to each other by simply placing the mating edges 28 and 30 of the shells next to each other and readily inserting clips 50 within slots 32, 40, 34, 42, 36, 44 and 38, 48. After the clips have been inserted within the slots, the central web 52 of each of the clips is flattened by a tool 104 as illustrated in FIG. 6. As shown more particularly in FIG. 5, this forces the edges 96, 98, 100, 102 of the hooks 70, 72, 74 and 76 against the inner surface of the shell and the side edges 86 and 88 of the legs against the edges of the slot. In the embodiment illustrated, four clips 50 may be used for connecting the shells 24 and 26 to each other, and a decorative band 22 is positioned over the clips in order to complete the assembly.

In order to disassemble the shell halves, the clips 50 may be quickly removed with a pair of pliers. With reference to FIG. 5, it can be seen that one of the jaws of the pliers may readily grip the end of hook 74 while the other jaw of the pliers is positioned over the end of hook 76. Thus, the H-shaped clip may be bent to its original position, as shown in FIG. 6, and removed from the slot.

Figure 4:
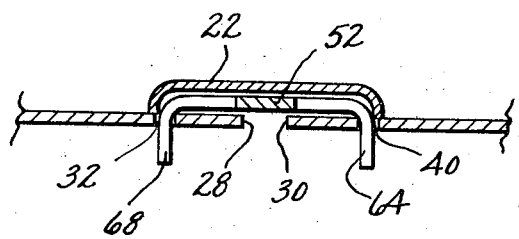
FIG. 4 is a partial cross-sectional view of the electric toaster shown in FIG. 3 taken substantially on the plane 4—4 of FIG. 3.

It can be appreciated that my unique clip arrangement permits relatively high manufacturing tolerances. As shown more particularly in FIG. 4, the distance between the slots 32 and 40 is related to the distance between the end portions 62 and 64 of the legs so that the mating edges 28 and 30 of the casing halves are spaced from each other to permit proper alignment of the shell halves. As shown, this distance between the mating edges 28 and 30 is rather substantial and is approximately equal to the width of web 52.

The distances between the hooks 70, 72, 74 and 76 of the clip are determined in a blanking die and then the center portion of the clip is bent; therefore the distances between the hooks of the clip will only be reasonably accurate. Moreover, since three or four clips are required to connect the shells to each other and since the location of adjoining slots of the shell halves may vary slightly, the legs of the clip allow a small amount of yield in the legs to permit the shell halves to properly align. This slight bending of the legs of the H is visible after assembly, i.e., the distance between legs 62 and 64 of the clip may be as much as one-eighth inch greater or less than the distance between the legs 66 and 68 of the clip.

From the foregoing description, it can be appreciated that with my unique clip arrangement, toaster shells may be readily and securely connected to each other. Assembly is easy. It is only necessary to place the clip in the slots and flatten the center web which forces the ends of the clip to tighten under the shell and tighten in the slots. Thus, an exceedingly simple, yet sturdily constructed toaster casing has been achieved.

I claim:

1. An electric toaster construction comprising:
   a. two casing shells, each of said shells having a mating edge which is complementary to the mating edge of said other shell;
   b. a slot formed in a first one of said shells, said slot being generally parallel to the edge of said first shell;
   c. a slot formed in the second one of said shells, said slot being generally parallel to the edge of said second shell and being positioned adjacent to the slot formed in said first shell;
   d. an H-shaped clip for connecting said shells to each other, said H-shaped clip including a center web portion and two pairs of legs extending outwardly from said web, the end portions of each of said legs being bent to be generally perpendicular to the main portion of said legs; and
   e. four hook portions integrally formed at the end portions of each of said legs of said H-shaped clip, each of said hook portions being arranged generally perpendicular to said legs, the hook portions of one of said pair of legs being inserted within one of said slots, and the hook portions formed on the other pair of legs being inserted within the slot formed in said other casing shell for securely holding said shells to each other.

2. An electric toaster construction as defined in claim 1 wherein a plurality of pairs of slots are formed in said shells and H-shaped clips are inserted in each of said pair of slots for spacing the mating edges of said shells from each other and for securely holding said casing shells in assembled spaced relationship.

3. An electric toaster construction as defined in claim 1 wherein said center web portion is thin enough so that it may be readily deformed during manufacture and flattened to lie in substantially the same place as said legs in order to securely hold the shells to each other.